United States Patent [19]

Mitchell

[11] Patent Number: 5,558,960

[45] Date of Patent: Sep. 24, 1996

[54] SEASONAL USE LEAD ACID ELECTRICAL STORAGE BATTERY

[75] Inventor: Howard E. Mitchell, Clarkston, Mich.

[73] Assignee: Exide Corporation, Reading, Pa.

[21] Appl. No.: 433,743

[22] Filed: May 3, 1995

[51] Int. Cl.[6] .................................................. H01M 4/36
[52] U.S. Cl. ............................ 429/205; 429/204; 429/60
[58] Field of Search ................................. 429/204, 205, 429/60

[56] References Cited

U.S. PATENT DOCUMENTS

| | | | |
|---|---|---|---|
| 2,649,766 | 8/1953 | Johnson | 429/205 |
| 3,948,680 | 4/1976 | Mao et al. | 136/26 |
| 4,081,899 | 4/1978 | Thornton et al. | 29/623.2 |

OTHER PUBLICATIONS

Declaration of Howard Mitchell dated Dec., 1995.
Chart of Battery Designs ("HIBRPATN.XLS") dated Sep. 15, 1995.

Primary Examiner—Stephen Kalafut
Assistant Examiner—Richard H. Lilley, Jr.
Attorney, Agent, or Firm—Nixon & Vanderhye

[57] ABSTRACT

A lead-acid battery formed of lead, acidic and basic materials, wherein these materials are in certain ratios by weight. The battery is intended for seasonal use applications, in which the battery may be idle for many months of each year. The battery includes positive and negative battery plates immersed in a sulfuric acid solution. The plates are formed of lead alloys and are coated with positive and negative, respectively, active materials. In addition, the acid solution includes small amounts of Sodium Sulfate that is set in certain proportions to the amount of positive lead oxide materials in the battery.

1 Claim, 1 Drawing Sheet

SEASONAL USE LEAD ACID ELECTRICAL STORAGE BATTERY

FIELD OF INVENTION

This invention relates to the field of a lead-acid electrical storage batteries, and to batteries intended for intermittent seasonal use.

BACKGROUND AND SUMMARY OF THE INVENTION

Lead-acid batteries (lead battery) are standard on most types of vehicles. In particular, lead batteries are used to start the internal combustion engines of automobiles, trucks and other types of vehicles and equipment. Most of the vehicles and equipment that use lead batteries for starting are operated on a regular, e.g., daily, basis. However, some vehicles with lead batteries operate only seasonally. For example, lead batteries are used to start the internal combustion engines of off-road vehicles, recreational vehicles (RV), lawn tractors, snow mobiles, agricultural equipment, construction equipment, military vehicles and boats, all of which may be left idle for months at a time during off-season periods. This invention pertains to lead-acid batteries for use with seasonally operated vehicles and equipment.

Lead-acid batteries are principally used in vehicles and equipment to provide electrical current to power electric motors to crank start the engine. In addition, lead-acid batteries supply electricity for lighting and ignition applications in vehicles and equipment. These battery requirements are colloquially known in the battery industry as SLI (Starting, Lighting, and Ignition) requirements. For SLI applications, it is well-known that lead acid batteries enjoy the best price/performance ratio for all energy storage devices available on the market today.

The demands placed on a battery may vary widely based on consumer habits, equipment usage, maintenance schedules, and other factors. The batteries must be designed and selected to satisfy these varying demands. Moreover, seasonal usage of a battery places especially difficult demands on a battery. Lead-acid batteries in seasonal and off-road vehicles and equipment may sit idle and unused for up to 11 out of 12 months of the year. This limited usage may continue year-after-year. Conventional lead batteries very often discharge and deteriorate over long idle periods, to such an extend that the batteries cannot start an engine when desired. For example, home consumers find a dead battery all to common and irritating in their recreational vehicles and lawn tractors, when they first start their vehicles, e.g, in the Spring, after the vehicles have sat idle for months. Accordingly, there has been a long-felt need for a battery that will allow a home user to start seasonal vehicles and equipment at the beginning of each season, year-after-year. Similar a long felt needs exist for all seasonally or intermittently operated equipment and vehicles that rely on a lead-acid battery for starting. For example, the need has long existed for a battery that can start a long-idled diesel engine, since diesel engines are particularly troublesome to start. It has proven especially difficult to fabricate a lead-acid battery for SLI applications that can satisfy the demands of starting an internal combustion engine after a long idle period.

Extended idle periods are detrimental to lead-acid batteries. Batteries are wet, active devices that self-discharge even when idle. Moreover, some vehicles and equipment place parasitic loads, e.g., clocks, security sensors and computer controllers, on the battery that continue to drain the battery for the months while the vehicle remains idle. Over the course of several months, these parasitic loads in combination with the natural self-discharge of a battery can place the battery in a extremely discharged state. As they discharge, the batteries gradually lose their capacity to provide current and power to start an engine. While batteries can be recharged, most engine alternators are not designed to provide the voltages and currents required to completely recharge a dead battery.

In addition, lead sulfate ($PbSO_4$) crystals on the plates are formed as batteries discharge. These crystals become relatively difficult to charge if left uncharged for many months. Moreover, the fluid in a battery tends to evaporate during months of idle time to such an extend that the top edges of the battery plates become exposed and are susceptible to corrosion. This corrosion of plates, especially positive plates, further deteriorates the ability of a battery to be recharged and hold a charge. Accordingly, conventional lead-acid batteries present long-unsolved problems that result when the battery sits idle for an extended period, such as occurs in vehicles and equipment that are only used seasonally.

The current invention overcomes the problems of prior art batteries that were due to long periods of idleness. It is an objective of this invention to overcome two major problems associated with long-idled batteries by applying battery design features that protect the battery from permanent deep discharge damage, and promotes charge acceptance after long idle periods. These long-felt problems have been overcome by a unique combination of battery materials that are applied in unique proportions that have been found by experimentation to enable the battery to better hold a charge during long idle periods. While most of the individual battery materials used in this invention are common to prior-art lead acid batteries, the proportions and ratio at which these well-known materials are applied are unique and heretofore unknown. The common materials which are used in certain unique concentrations and proportional amounts, include as the most prominent materials lead and acid. By maintaining a unique ratio of lead and acid concentrations, a battery has been invented that exhibits superior performance after long periods of idleness.

This invention also uses certain materials and/or material characteristics that are unique either in their use or in their amount. These materials relate to the negative grid metal alloy, positive grid metal alloy, negative leady oxide paste-mix formulation, positive leady oxide paste mix formulation, separator material type, sulfuric acid electrolyte, and a sulfuric acid electrolyte additive. The optimal materials and their proportions and ratios of use are disclosed in detail in the body of this specification. These unique materials and the conventional materials, used in unique proportions and percentages, have by experimentation been found to provide cumulatively an advantageous lead acid battery that is well-suited for seasonal use and overcomes many of the long-felt problems that have plagued lead-acid batteries in the past.

BRIEF DESCRIPTION OF THE DRAWINGS

These, as well as other objectives and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE DRAWINGS

Figure 1:
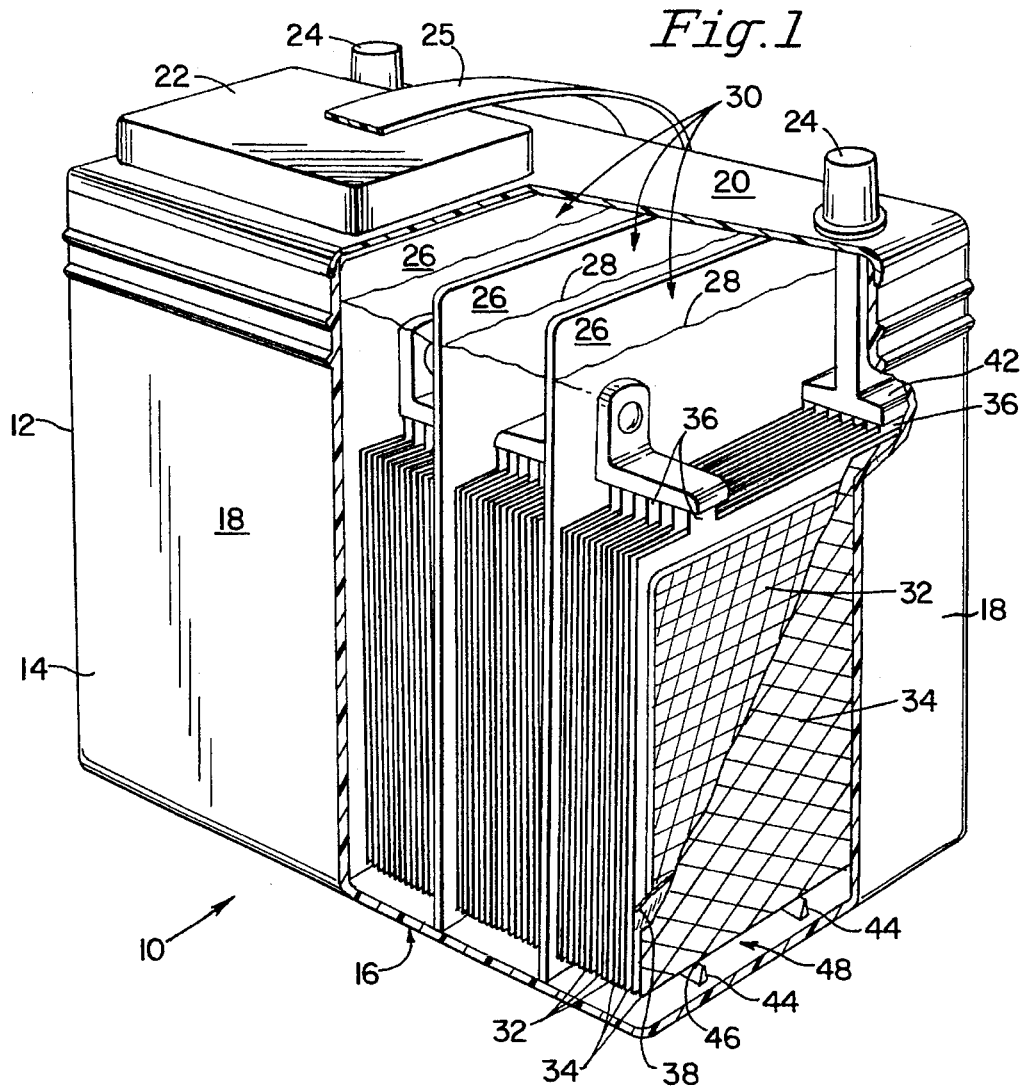
FIG. 1 is a perspective view of a lead-acid battery, a portion of which is cut away to show the inside components of the battery.

FIG. 1 shows a lead-acid battery 10 that is housed in a battery casing 12 that is generally rectangular in shape and is formed of a conventional plastic material used for battery casing. The casing 12 includes a bottom container 14 having a bottom floor 16 and four side walls 18, and a top panel cover 20 that seals the top of the container to prevent leakage of the acid fluid from the container. The top may include one or more vent holes (not shown) and vent caps 22 that permit gases generated within the battery housing to escape and thereby prevent buildup of extreme pressures within the battery casing. In addition, positive and negative conductive posts 24, preferably tapered, extend up through the top panel to allow for electrical clamps to connect to the battery. In addition, the outside battery housing may include a strap 25 or other battery lifting device to facilitate removal of the battery during extended idle periods and to encourage the battery user to disconnect the battery during extended idle periods.

The components inside of the battery housing include several partition walls 26 that extend vertically through the container and partition the container 14 into a plurality of separate cell compartments. These partition walls are generally sealed to the interior surfaces of the bottom floor 16 and front and back side walls 18 of the container to prevent seepage of acid liquid 28 past the partition walls. In the preferred embodiment, the sulfuric acid electrolyte mixture has the following formulations Sulfuric acid having a 1.835 specific gravity (pursuant to Federal Specification O-S-801) added at 35% to 38% by weight;

Sodium Sulfate added at 0.09% to 0.12% by weight;

water forms the balance of the acid formulation.

In addition, the level of the acid in the battery cells is significantly higher than in conventional batteries. In this regard, the amount of acid by volume above the battery plates 32, 34 in the preferred embodiment is 0.10 cubic centimeters of acid for each square centimeter of plate surface area that faces an opposing surface of an adjacent plate. In addition, it is preferred that the electrolyte density be maintained at 1.070 s.g. to lower the freezing point of the acid to approximately 20° F.

The partitioned walls and the walls of the container form cell compartments 30 that each contain a vertical stack of alternating negative plates 32 and positive plates 34, which are described in more detail in connection with FIG. 2. The battery negative plates are enclosed within a porous envelope 38 which separate the plates from the positive plates and catch in the bottom of the envelope debris that may fall off the plates. The envelopes, or alternatively loose-leaf separators, may be formed of a polyethylene sheet that preferably has an electrical resistance of approximately 7 to 8 m$\Omega$/in$^2$ and a backweb thickness of approximately 0.007 to 0.010 inch. By enveloping just the negative plates, the positive plates are fully exposed to the acidic electrolyte in each battery cell 30 and the bottom edges of the positive plates may be directly bonded to the bottom of the battery cell to secure the plates in place.

The plates each have upwardly extending lugs or tabs 36 that provide an electrical connection contact. The negative plates are commonly connected by through-the-partition connectors 40 that are in electrical contact with the plates lugs. Similarly, a post strap connector 42 is attached to the bottom of the negative post and also in electrical contact with plate lugs. The positive plates are similarly connected with through the partition connectors and a post strap attached to the positive post. These intercell partition connectors are formed of lead alloys that preferably have the following compositions

| Element | % By Volume |
| --- | --- |
| antimony | 2.5 to 3.5% |
| tin | 0.40 to 0.75% |
| arsenic | 0.15 to 0.30% |
| lead | Balance |

The bottom edges of the battery plates 32, 34 are supported by element rests 44 that may sit underneath the plates on the bottom floor 16 of the container. The element rests may be ridges, generally less than 3.0 mm high, formed on the bottom floor of the container. The plates, especially the unenveloped positive plates, are anchored to the element rests by a bonding material 46, such as a resin epoxy, hot melt adhesive or a mechanical fastener such straps, tapes, blocks, or other bonding material or fastener that prevents movement of the plates in the battery container. The element rests hold the bottom of the plates off the bottom surface of the cells so that a sediment sump 48 below the plates to contain any debris or other foreign material and separate and hold that material away from the plates.

Figure 2:
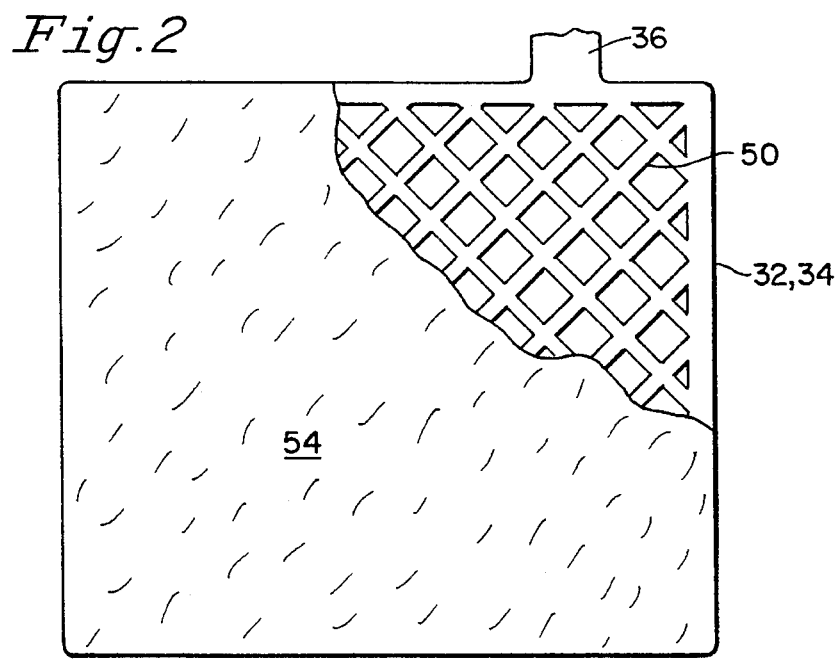
FIG. 2 is a front view of a battery plate, with a portion of the underlying grid shown as exposed for illustrative purposes.

FIG. 2 shows a representative battery plate 32, 34 in which a portion of the active material has been removed from the underlying plate grating 50 to show the grid structure of the plate that provides a frame that supports the active material. The plate may have edges 52 on two or four sides for structural support.

The lead alloy for the positive grid grating is preferably formed from the following composition:

| Element | % By Volume |
| --- | --- |
| Antimony | 1.5 to 2.8% |
| Tin | 0.75 to 1.25% |
| Arsenic | 0.10 to 0.15% |
| Selenium | 0.028 to 0.038% |
| Sulfur | 0.001% (approx. max) |
| Copper | 0.05 to 0.07% |
| Lead | Balance |

Similarly, the lead alloy for the negative grid grating is formed from the following compositions

| Element | % By Volume |
| --- | --- |
| Calcium | 0.08% to 0.16% |
| Aluminum | 0.008% to 0.04% |
| Lead | Balance |

The gratings provide a framework that supports the active material 54. Usually, the active material is formed as a paste that is applied to the grating of the grid gratings. The leady oxide positive paste mix has a dry uniformed density of 3.9 to 4.3 grams per cubic centimeter (64 to 70 grams/cubic inch) in a preferred embodiment. The leady oxide positive paste mix is formed from a lead oxide paste having the following additional ingredients (the stated amount by weight of the ingredients are approximate and can vary, e.g., by 1%):

Leady oxide (e.g., PbO and $PbO_2$);

Binder added at 0.15 ounces per pound of lead oxide;

Water added at 59 cubic centimeters per pound of lead oxide;

sulfuric acid added at 33 cubic centimeters per pound of lead oxide.

Similarly, the lead oxide negative paste mix is formed from a lead oxide having the following additional ingredients (the stated amount by weight of the ingredients are approximate and can vary, e.g., by 1%):

Leady oxide (e.g., PbO and $PbO_2$)

Binder, e.g., fiberous materials, added at 0.15 ounces per pound of leady oxide;

Expander (anti-shrink agent, e.g., carbon black, berrium sulfate) added at 0.01 pounds per pound of leady oxide;

Anti-oxidant (e.g., oil) added at 0.0356 ounces per pound of leady oxide;

Water added at 55.5 cubic centimeters per pound of leady oxide and sulfuric acid added at 33 cubic centimeters per pound of leady oxide.

These paste mixtures are applied over the gratings of the plates in a conventional manner to form the completed negative and positive plates. It is preferable that the positive and negative pastes are applied to the grids of the plates in the ratio by weight of 1.15 to 1.25 parts of positive dry unformed paste to 1.00 part of negative dry unformed paste, for each cell in the battery. Once the paste is applied to the grids of the plates, it is allowed to cure in a controlled room to allow completion of chemical reactions and the parts to dry. Once the plates are installed in a battery casing, sulfuric acid electrolyte fluids are added and a charge is applied to the battery to "form" the active materials.

The above-described materials when formed (changed) provide electrochemical capacity potentials that have been previously well established using Faraday's law as follows:

4.463 grams/ampere hour of charged positive PbO active material, 3.866 grams/ampere hour of charged negative Pb active material;

3.660 grams/ampere hour of sulfuric acid material.

It is preferred that these active materials be used in the battery in the follow ratios:

1.00 charged negative lead Pb active materials by weight;

1.3 to 1.50 charged positive lead oxide PbO active materials;

1.10 to 1.20 1.835 s.g. sulfuric acid, and 0.025 to 0.035 sodium sulfate.

The invention has been described in connection with its preferred embodiment. The invention is not limited to the disclosed embodiment. Rather, the invention covers various modifications and equivalent arrangements included within the spirit and scope of the appended claims.

What is claimed is:

1. A lead acid battery comprising:

a casing containing a sulfuric acid electrolyte solution including sulfuric acid and sodium sulfate;

a plurality of positive plates immersed in the sulfuric acid electrolyte solution and including positive active lead materials;

a plurality of negative plates interspersed between the positive plates and immersed in the sulfuric acid electrolyte solution and including negative active lead materials;

wherein the ratio by weight of materials in a cell of the battery before discharge comprises:

1.3 to 1.5 parts active positive lead material to one part negative lead material, 1.1 to 1.2 parts sulfuric acid to one part negative lead material, and 0.025 to 0.035 parts sodium sulfate to one part negative lead material.

* * * * *